Figure 1:
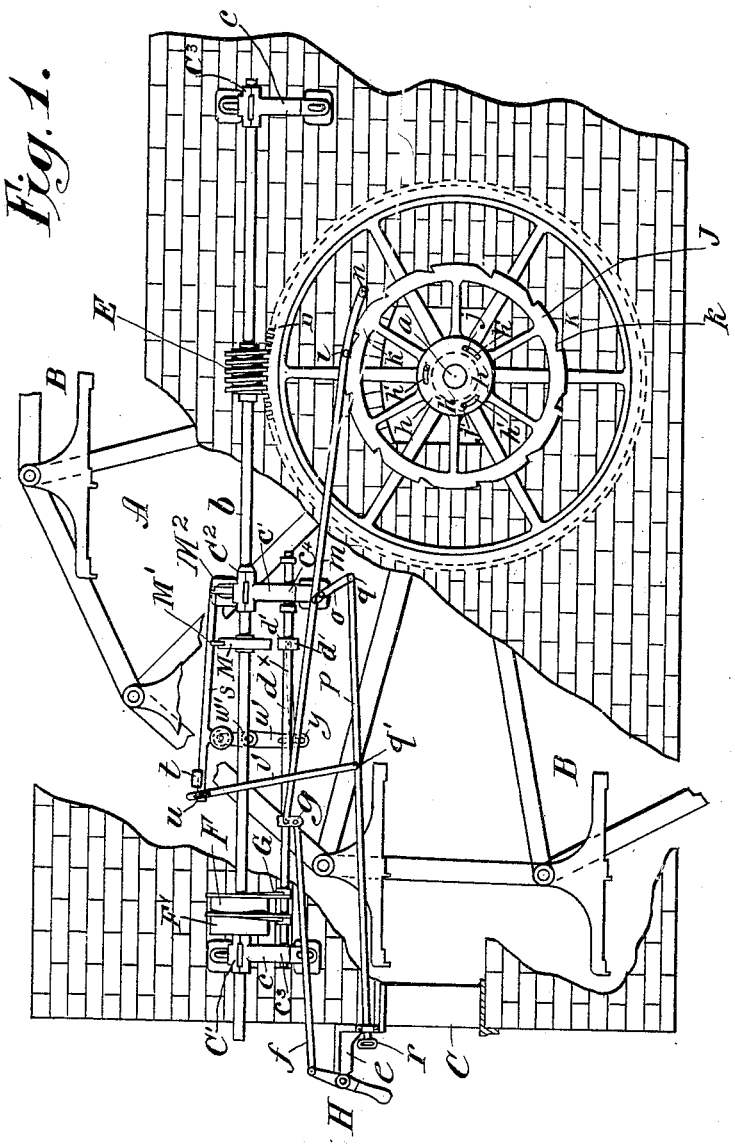

No. 824,553. PATENTED JUNE 26, 1906.
J. J. LINDEN.
STOP MECHANISM FOR BAKERS' OVENS.
APPLICATION FILED JAN. 23, 1905.

2 SHEETS—SHEET 1.

Witnesses
Edgeworth Greene
Anna H. Van Horenberg

John J. Linden Inventor
By his Attorney
W. P. Peele Jr

No. 824,553. PATENTED JUNE 26, 1906.
J. J. LINDEN.
STOP MECHANISM FOR BAKERS' OVENS.
APPLICATION FILED JAN. 23, 1905.
2 SHEETS—SHEET 2.
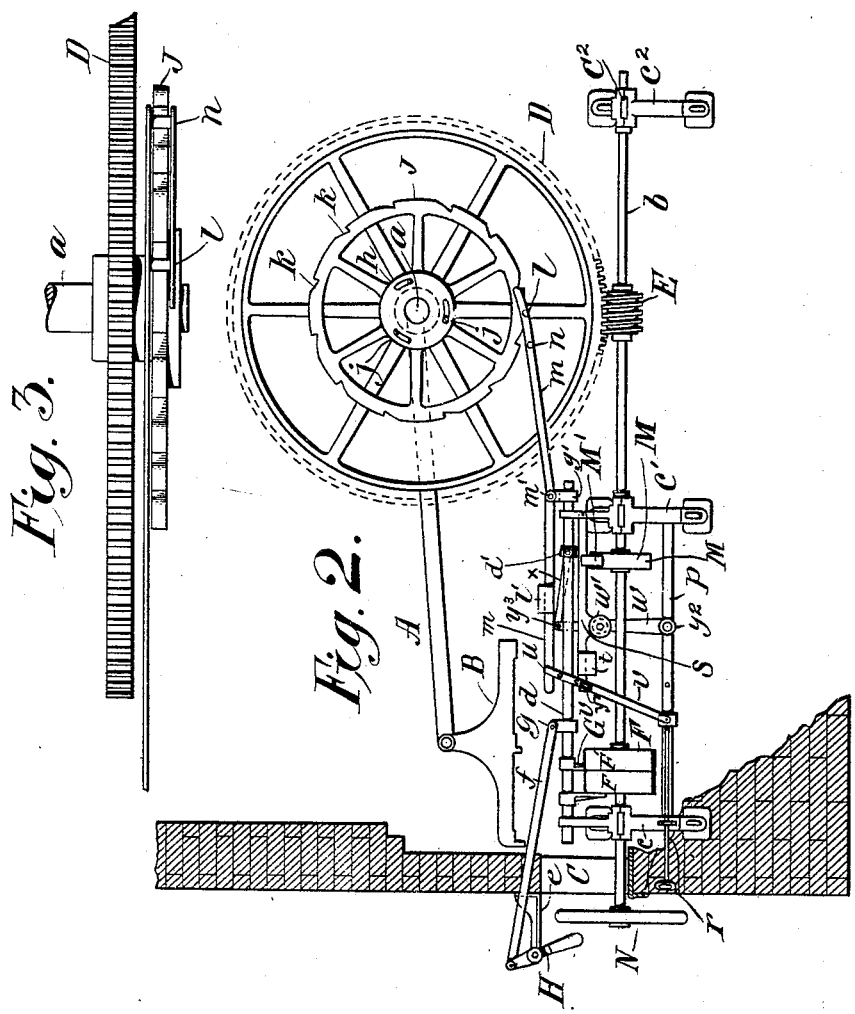

UNITED STATES PATENT OFFICE.

JOHN J. LINDEN, OF NEW YORK, N. Y.

STOP MECHANISM FOR BAKERS' OVENS.

No. 824,553.  Specification of Letters Patent.  Patented June 26, 1906.

Application filed January 23, 1905. Serial No. 242,257.

*To all whom it may concern:*

Be it known that I, JOHN J. LINDEN, a citizen of the United States, and a resident of the city of New York and State of New York, have invented certain new and useful Improvements in Stop Mechanism for Bakers' Ovens, of which the following is a specification.

My invention relates to that class of bakers' ovens in which a revolving reel carries the material to be baked. This reel is equipped with twelve or any desired number of shelves so hung as to remain horizontal during the revolution of the reel. Sometimes these shelves are single and adapted to receive only a single row of pans. Sometimes the shelves are double-decked, so that they can receive two sets of pans, one above the other. The reel is usually so set as to present the shelves in succession to the oven-door, and for light work, such as crackers or biscuit, the heat of the oven is so controlled with reference to the revolution of the reel that a single revolution is sufficient to bake the dough or other material in the pans. In this way the process of baking may be made continuous, the finished pans being removed and pans with fresh material being substituted continuously as the shelves present themselves at the oven-door. For the successful operation of such an oven it is of course necessary that some stopping and starting mechanism for the reel should be used, so that the reel shall not move during the short space of time required for the removal of the pans from one shelf and the substitution of fresh pans. It is also necessary that means should be provided for regulating the stopping-places of the reel, especially with double-deck shelves, so that the stopping shall occur in line with the oven-door.

The object of my invention is to provide an improved stop mechanism which is automatic in its operation and capable of adjustment, so that when the reel is set in motion it will be stopped automatically at the predetermined point without any action on the part of the baker, whose only attention to the reel is to release or throw back the stop mechanism as soon as he has changed the pans, so that the reel may start again, and then wait for the reel to bring the next tray to the door, when it will stop of itself until again released.

In the accompanying drawings I have shown two slightly different applications of my invention, in one case the stop mechanism being set above and in the other below the drive-wheel of the reel in order to accommodate itself to the available space at the side of the oven.

Figure 1 is a side elevation showing the wall of the oven partly broken and with the stop mechanism set above the main wheel. Fig. 2 is a side elevation showing the mechanism set below the main wheel. Fig. 3 is an enlarged plan of the wheel and ratchet of Fig. 2.

Same letters indicate similar parts in the different figures.

First describing that form of my invention where the stop mechanism is set above the drive-wheel of the reel, which form is represented in Fig. 1 of the drawings, the letter A indicates the reel, and B the swiveled shelves or trays carried by said reel. C indicates the oven-door, in front of which the baker stands. D indicates the main or driving wheel, which is provided with a worm upon its periphery, said worm-wheel being disposed outside of the oven and mounted upon a shaft $a$, which passes through the brick wall forming the side of the oven. It will of course be understood that the reel, which is of ordinary construction, is mounted on the shaft $a$ inside of the oven. The rotation of this reel is brought about in the following manner: A worm E, mounted on a worm-shaft $b$, meshes with the teeth of worm-wheel D and is thereby capable of turning said worm-wheel. Said shaft $b$ is journaled in bearings $C'$ $C^2$ $C^3$ in supports $c$, $c'$, and $c^2$, that are fastened to the brick wall of the oven, and said shaft $b$ is turned by the usual pulley F, that is driven by belting from a source of power. (Not shown.) The function of the stop mechanism is therefore to shift the belting from said pulley F, which is fast on the shaft $b$, to a loose pulley $F'$, thereby preventing the transmission of power to the shaft $b$ and simultaneously overcoming the momentum or inertia of the reel and its driving mechanism by the application of a suitable brake. G indicates the belt-shifter, which is mounted on a rod $d$, that is slidably carried in bearings $c^3$ $c^4$ on the supports $c$ $c'$, respectively.

As thus far described the oven and the mechanism are of ordinary and well-known construction. My improved stop mechanism provides means for moving the belt-shifter automatically by the rotation of the worm-wheel D when it reaches a point determined by previous adjustment. It also provides for braking the driving-shaft simultaneously with the shifting of the belt to the loose or idle pulley. It also provides for throwing the stop mechanism out of engagement whenever the material to be baked is of such a nature as to require more than one revolution of the wheel before removing said material from the oven.

Loose upon the shaft $a$ is a hub-plate $h$, that is provided with a number of concentric slots $h'$, through which tap-bolts $j$ pass into the hub-plate of the worm-wheel D. By turning the hub $h$ to the right and left, first loosening the tap-bolts $j$, the throw of the worm-wheel in operating the stop mechanism is regulated, and by tightening said tap-bolts so as to bind the hub-plate in the set position the successive throws are fixed until such time as a new adjustment may be desired. Mounted on the hub-plate $h$ is the ratchet J, whose teeth $k$ are shaped, as shown, so as to receive the pins $l$ $n$ of a shifting-arm $m$, one end of which is pivoted to a lug $g$, that is fast upon the rod $d$. The shifting-arm $m$ is arranged above the ratchet-wheel in this form of my invention, whereby the pin $l$ falls into the recess in front of one of the teeth by gravity, and said shifting-arm $m$ in the rotation of the ratchet by the turning of the wheel is thereby pushed, together with the rod $d$, toward the front of the oven, this action shifting the belt from the fast pulley F onto the loose pulley F', thus disconnecting the power. By the continued rotation of the ratchet the peripheral surface of the tooth bears against the pin $n$, thereby raising the shifting-arm $m$ and disengaging the pin $l$ from said tooth.

Mounted on the worm-shaft $b$ is a wheel M, just above which a brake-shoe M' hangs from an arm $s$, one end of which arm is pivoted to the bearing M². A weight $t$ is provided at or near the opposite end of the arm $s$. Obviously when this weight is allowed to exert its force on arm $s$ the brake-shoe M' then presses on the wheel M and prevents the worm-shaft $b$ from turning. It is therefore necessary to provide means lifting the arm $s$ against the force exerted by the weight $t$ in order to brake and stop the rotation of worm-shaft $b$ at such period when the pin $l$ has been raised out of engagement with a tooth on the ratchet-wheel. Two ways of lifting said arm $s$ to release the brake M' from the wheel M to permit the operation of the worm-shaft $b$ are provided, one way being used when the reel is to be started and stopped intermittently for each tray and the other way when the reel is to be allowed to run for a time without interruption. In the first case the handle H, pivoted to a bracket $e$ at the front of the oven, is used. This handle is fastened to a rod $f$, whose inner end is pivoted to the lug $g$ on rod $d$. By drawing outwardly the handle H the rod $d$ and shifting-arm $m$ are thrown back to their original positions, and the belt is shifted back to the fast pulley F. Also in this action the brake-shoe M' is lifted by the following instrumentalities: On the rod $d$ is a block $d'$, which is adjustably connected with a brake-lifting device $w$ by a short link $x$, that is shown in dotted lines. The brake-lifting device $w$ is pivoted at $w'$ to the oven-wall and has a vertical slot $y$, in which the end of the link $x$ is slidably engaged. When said brake-lifting device stands in a vertical position, the brake-shoe on the arm $s$ does not press upon the wheel M; but when the rod $d$ is moved so as to shift the belt onto the loose pulley F it, through the link $x$, swings the brake-lifting device out of the perpendicular, and thus permits the brake-shoe to descend upon the wheel M. It will therefore be readily understood that in the baking of crackers and other material which requires only a single revolution of the wheel the baker, standing at the door of the oven, has only to remove the pans of baked material from one tray at a time as the reel is automatically stopped and as soon as the fresh pans have been placed on the tray pull the handle H, and thus start the reel turning again.

When the reel is to be run several revolutions without stopping, the stop mechanism is thrown out of action by means of a handle $r$, which is at the end of a rod $p$. As shown in Fig. 1, this rod $p$ is suspended from the support $c'$ by a link $o$, to which it is pivoted at $q$. The upper end of this link $o$ may be forked or otherwise adapted to engage the shifting-arm $m$, so that when the handle $r$ is pulled outwardly to bring said link $o$ into a vertical position it thereby lifts up said arm $m$ and holds both pins $l$ and $n$ out of engagement with the ratchet J. At the same time, by means of a rod $v$, which is pivoted at $q'$ to the rod $p$ and which is slotted at its upper end to receive a pin $u$ on the end of rod $s$, said rod $s$ is by the aforesaid action of rod $p$ lifted to hold the brake M' away from the wheel M. Hence by the drawing out of the rod $p$ the wheel is permitted to rotate continuously until the baker pushes in the rod $p$, and thus throws the stop mechanism again into action.

In the construction illustrated in Fig. 2, wherein the shifting-arm $m$ is set below the wheel, the pin $l$ is pressed into the tooth-space by a weight $l'$ on the arm $m$, which is pivoted at $m'$. In this form the motion of the wheel D draws the rod $d$, (which is fast to the lug $g'$, that forms the pivotal bearing $m'$,) away from the front of the oven to shift the belt from the fast pulley F to the loose pulley F', the positions of these pulleys being reversed in this view. Some other differences comprised in the form of my invention shown in Fig. 2, whereby the same result is attained in a slightly different way, are as follows: The rod $p$ is mounted in bearings in the supports $c$ $c'$, and the rod $v$ is forked at the upper end to embrace and lift the arm $m$. It is also provided with a slot $y'$, in which works a pin, as before, on the rod $s$. In this view the rod $p$ has a pivotal connection $y^2$ with the brake-lifting device $w$, which latter is pivoted at $y^3$ to the link $x$. In this view also the action of the rod $p$ is the reverse to that shown in Fig. 1, it being pushed inwardly to enable the rod $v$ to release the mechanism for continuous running of the wheel.

By means of a wheel N, attached to the worm-shaft $b$, (this wheel being shown in Fig. 2, but not shown in Fig. 1,) the said shaft may be turned by hand when desired.

I claim—

A stop mechanism for bakers' ovens which consists of an oven-reel, a wheel to turn said reel, tap-bolts extending from the hub of said wheel, and a shaft carrying said wheel, a ratchet-wheel loose upon said shaft, a hub-plate for said ratchet-wheel having concentric slots to receive said tap-bolts, whereby the ratchet-wheel may be adjusted circularly with relation to said wheel and connected thereto as adjusted, a belt-shifting rod normally held in engagement with said ratchet-wheel and operated thereby at predetermined intervals, and means whereby braking action is applied when the power is shut off, together with means for reapplying the power and removing the braking action.

JOHN J. LINDEN.

Witnesses:
ALFRED J. KENNEDY,
LOUIS H. RAVNER.